(No Model.)

E. RUTZLER.
TRAP FOR EXHAUST STEAM PIPES.

No. 379,542. Patented Mar. 13, 1888.

Witnesses:
Joseph W. Roe,
C. E. Sundgren.

Inventor:
Enoch Rutzler
by his attys
Brown & Hall.

UNITED STATES PATENT OFFICE.

ENOCH RUTZLER, OF BROOKLYN, ASSIGNOR TO RUTZLER & BLAKE, OF NEW YORK, N. Y.

TRAP FOR EXHAUST-STEAM PIPES.

SPECIFICATION forming part of Letters Patent No. 379,542, dated March 13, 1888.

Application filed November 17, 1887. Serial No. 255,384. (No model.)

*To all whom it may concern:*

Be it known that I, ENOCH RUTZLER, of Brooklyn, in the county of Kings and State of New York, have invented a new and useful Improvement in Traps for Exhaust-Steam Pipes, of which the following is a specification.

My invention relates to those traps which are in cities frequently placed upon the upper ends of exhaust-pipes, in order to separate water from the exhaust-steam and collect and draw off the water, thereby avoiding its distribution over roofs and surrounding objects.

In carrying out my invention I provide a chamber in which the exhaust-pipe terminates, and which is open at the top and has a drain-pipe for water leading from its bottom, and I provide in the chamber and above the end of the exhaust-pipe a canopy or deflector, against which the escaping steam impinges and to which water in the steam adheres, and which affords a space around its periphery and between it and the wall of the chamber for the upward escape of steam. I preferably make the canopy or deflector of a conical or downwardly-flaring form, and I provide it with openings for the upward escape of steam near its center or highest point, and I provide above these openings hoods which extend laterally and are open at their outer ends for the lateral discharge of steam against the wall of the chamber. This chamber may be of double-conical form, largest in diameter at the center of its height, and the deflector may have upwardly-projecting radial wings or blades, which serve to draw and direct the steam to the openings in the canopy or deflector formed between such wings or blades and above which are the laterally-extending hoods.

The invention consists in novel features of construction and combinations of parts hereinabove described.

Figure 1:
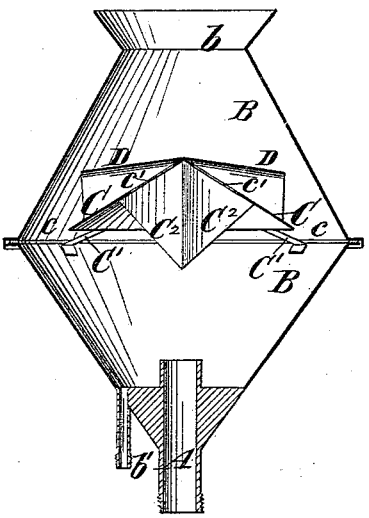
Figure 2:
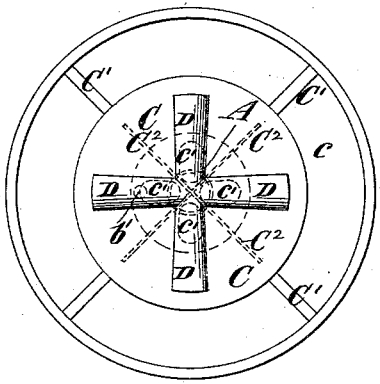
Figure 3:
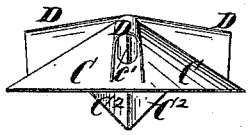

In the accompanying drawings, Figure 1 is a vertical section of a device embodying my invention. Fig. 2 is a plan of the device, the upper half of the chamber being removed; and Fig. 3 is a side view of the canopy or deflector separate from other parts.

Similar letters of reference designate corresponding parts in the several figures.

A designates the upper end of an exhaust-pipe, and B a chamber in which the end of the exhaust-pipe terminates, or with the bottom of which said pipe communicates. As here represented, the chamber B is of double-conical form, or made in the form of the frustums of two cones united at their bases, and therefore has its largest diameter at about the middle of its height.

The chamber B is open at the top, as shown at $b$, and from its bottom extends a drain-pipe, $b'$, which may lead to the leader-pipe of the building, or to any suitable receptacle if it be desired to save the water separated from the exhaust-steam.

Within the chamber B is arranged a canopy or deflector, C, which is immediately above the exhaust-pipe A, and, as here shown, is conical or downwardly-flaring in form, with its apex or highest point at the center, and this canopy or deflector extends outward toward the wall of the chamber, leaving an annular space, $c$, between it and said wall.

As here represented, the canopy or deflector C is supported by arms or braces C', which extend from it to the wall of the chamber B, to which they are secured. In the canopy or deflector C, and near its apex or highest point, are openings $c'$, (shown by dotted lines in Fig. 2,) and to direct the steam issuing from the pipe A to these openings the canopy C has downwardly-extending wings or blades $C^2$, which radiate from its center, and between which the openings $c'$ are placed. The blades or wings $C^2$ serve to promote the passage of steam uniformly to the several openings $c'$, which are formed in the canopy or deflector C.

The canopy C is surmounted by hoods D, which are of inverted-U shape in transverse section, as here shown, and which are placed immediately above the openings $c'$. These hoods D extend radially, and, as here represented, are nearly horizontal, and they are open at their outer ends, so that the steam passing upward through the openings $c'$ will impinge against the surfaces of the hoods, and will thereby be directed outward in a lateral direction and against the wall of the chamber B. I have here represented the canopy C as provided with but four openings c' and four hoods D; but it is obvious that a greater or less number of openings and hoods might be provided.

In the operation of my device the blast of steam issuing from the pipe A strikes upward against the canopy C, and passes through the openings c', and by striking against the hoods D this steam is directed outward laterally and impinges against the wall of the chamber B, and thence passes upward from the open top b of the chamber and escapes. By the impingement of the steam against the canopy C and against the hoods D, and then against the wall of the chamber B, the water is freed therefrom and adheres to the several surfaces against which the steam impinges, and thence trickles down these surfaces, and finally reaches the bottom of the chamber B, from which it passes through the drain-pipe b'.

It is desirable to employ a chamber, B, of the form here shown, because it affords room at its larger part for a canopy or deflector of ample size, and is not unduly large at its top and bottom. The device may be composed of sheet-iron or other sheet metal, with its seams riveted or otherwise formed.

What I claim as my invention, and desire to secure by Letters Patent, is—

1. The combination, with a section of exhaust-pipe, and a chamber in which the pipe-section terminates, and which is open at the top and has a drain-pipe leading from its bottom, of a deflector, C, arranged in the chamber above the exhaust-pipe, and having openings c', for the upward escape of steam through it, and hoods D, secured to the top of the deflector, and into which said openings c' deliver, and which are open at their outer ends for the lateral discharge of steam against the wall of the chamber, substantially as herein described.

2. The combination, with the chamber B, of double-conical form, or largest in diameter between its ends and open at the top, of the exhaust-pipe section A, entering its bottom, the drain-pipe b', leading from its bottom, and the canopy or deflector C, arranged in the largest part of the chamber and having openings c' for the passage of steam through it, and the hoods D, surmounting the canopy, and into which said openings c' deliver, and which are open at their outer ends, substantially as herein described.

3. The combination, with a chamber open at the top and having an exhaust-pipe section entering its bottom, and a drain-pipe leading from its bottom, of the conical or downwardly-flaring deflector or canopy C above the exhaust-pipe, having downwardly-projecting radial wings or blades $C^2$, and openings c' between the wings or blades near its highest part, and surmounted by the laterally-extending hoods D above said openings, substantially as herein described.

ENOCH RUTZLER.

Witnesses:
FREDK. HAYNES,
HENRY J. MCBRIDE.